Patented Aug. 20, 1946

2,405,962

UNITED STATES PATENT OFFICE 2,405,962

PROCESS FOR POLYMERIZING ETHYLENE

Alfred T. Larson, Wilmington, Del., and Norman W. Krase, Swarthmore, Pa., assignors to E. I. du Pont de Nemours & Company, Wilmington, Del., a corporation of Delaware No Drawing. Application March 14, 1942, Serial No. 434,774

4 Claims. (Cl. 260—94)

This invention relates to polymerization processes and more particularly to polymerization involving ethylene, either alone or together with other polymerizable materials.

Various proposals have been made for polymerizing ethylene, the prime objective of which has been the production of high molecular weight polymers of high tensile strength. Thus, it is known that ethylene and its homologs can be polymerized to products of an oily nature by the use of elevated temperatures such as 200 to 400° C. and pressures somewhat above atmospheric. It is also known that solid and semi-solid polymers of ethylene may be produced, such as disclosed in U. S. 2,153,553—Fawcett et al., by employing elevated pressures such as 500 to 1000 atmospheres and moderately elevated temperatures such as from 100 to 400° C.

It is an object of the present invention to provide an improved process for polymerization of ethylene, either alone or together with other polymerizable materials, the process being characterized by the fact that the products obtained have improved physical characteristics such as higher melt viscosity, greater tensile strength, higher flex values, greater stiffness, higher softening temperatures and greater tear resistance.

Other objects and advantages of the invention will be apparent from the following specification in which the preferred details and embodiments of this invention are described.

The above and other objects appearing hereinafter are accomplished according to this invention by subjecting ethylene, either alone or with other polymerizable materials to polymerization conditions of elevated pressure and temperature in the presence of polymerization-favoring quantities of oxygen or substances yielding oxygen under the reaction conditions and in the presence of quantities of benzene or chlorbenzene, specifically monochlorbenzene. Preferably, also, the polymerization is carried on in the presence of water.

Molecular oxygen may be employed, and preferably is employed, as the catalytic material in the practice of this invention, but materials which yield oxygen under the conditions of the reaction may be used, if desired, together with or in place of the free oxygen. Thus, for example, free oxygen may be employed alone or together with or it may be substituted for by such materials as peroxide compounds by which term is meant compounds which are either formed by hydrogen peroxide on ordinary acids or else give rise to hydrogen peroxide on treatment with dilute sulfuric acid. Examples of such compounds are: persuccinic acid, lauroyl peroxide, tetralin peroxide, urea peroxide, butyryl peroxide, acetyl peroxide, acetyl benzoyl peroxide, peracetic acid, alkali metal persulfates, perborates, percarbonates, and the like. Due, however, to the superior characteristics of the products obtained when polymerizing ethylene according to this invention while employing free or molecular oxygen in catalytic amounts, it is preferred to practice the present invention in the presence of free or molecular oxygen alone as the catalytic material.

The preferred pressures range from 500 to 1500 atmospheres and the preferred temperatures from 150 to 275° C., although both lower and higher temperatures and pressures may be employed, if desired. The quantities of benzene, or chlorbenzene, based upon the amount of ethylene introduced, may vary over a fairly wide range although, for most efficient operation and best characteristics of the ethylene polymer, the range of quantities of benzene or chlorbenzene falls within certain definite limits, these limits being concentrations such that the benzene or chlorbenzene remain substantially completely in the compressed ethylene (vapor) phase. Within these definite limits, it has been found that, for best operation and highest quality polymer, the benzene or chlorbenzene should fall, preferably, within the range of 0.1 to 0.5 part by weight per part of the ethylene introduced.

Although we have no explanation which satisfactorily describes the effect of the benzene or chlorbenzene upon ethylene polymerization, nevertheless, the fact remains that when employing benzene or chlorbenzene in the proportions and according to the methods indicated, a polymerization product is obtained having physical characteristics superior to those ethylene polymers obtained when no benzene is employed.

Suitable measures for rapidly withdrawing heat of reaction may be employed, and preferably are employed, inasmuch as the polymerization reaction itself is exothermic. Furthermore, polymer quality varies with variation in temperature and it is important to operate with constant temperature. Consequently, according to a further feature of this invention, we prefer to carry on the polymerization in the presence of water, as well as benzene. We believe that the advantageous effect produced is due to the water absorbing or dissipating at least a part of the heat given off in the exothermic reaction, i. e. by vaporization of water introduced. In this manner the polymerization reaction itself may be maintained fairly closely within the temperature ranges which we have found to be most desirable for optimum operation. We have found, for example, that for best operation and highest quality polymer, based upon the ethylene introduced, the quantity of water employed should fall within the range of from 1 to 6 parts by weight per part of ethylene, whereas, as previously indicated, the benzene employed should fall, preferably, within the range of 0.1 to 0.5 part per part of ethylene.

As a further feature of the present invention, the polymerization reaction should be carried on, for best results in terms of the polymerization product obtained, by employing ethylene which contains from 30 to 150 parts per million of oxygen. We believe that the oxygen in this range, which may be contained within the ethylene, has a catalytic effect upon the polymerization reaction.

By continuous operation, a high rate of passage of ethylene through the reaction vessel may be accomplished with less sacrifice in yield of final product than has been previously experienced. The step of continuous removal of the product may be advantageously followed, according to the present invention, so as to keep the reaction vessel space comparatively free from the final product.

According to the preferred methods of operating the present invention, ethylene containing from 50 to 80 parts per million of oxygen is continuously introduced under pressure into a reactor in which conditions favoring polymerization are maintained and the final polymer is continuously removed from the reaction zone. The essential conditions used in the preferred continuous operation of this invention, such as technique of agitation, control of pH, isolation of finished products and recirculation of unreacted materials may be varied widely. For example, ethylene under pressure may be mixed continuously with water and the ethylene-water mixture, which is maintained in a turbulent state, passed under pressure into a reactor together with benzene, which may be injected separately into the reactor or together with the ethylene-water mixture. In the reactor the time of contact and temperature are controlled to effect the required degree of polymerization.

The resulting mixture of polymer may then be continuously passed to an area of lower pressure to recover unreacted ethylene and the polymer isolated by filtration. When polymerizing ethylene with a liquid unsaturated compound, the latter may be introduced continuously as a component of the water phase.

When it is desired to polymerize continuously two unsaturated gases, both having critical temperatures below the operation temperature, e. g. ethylene and tetrafluoroethylene, the gas may be premixed in the desired proportions and brought into contact with the water phase under pressure or the gases may be injected separately into the water phase in the desired proportions.

For rapid polymerization, according to the present invention, it is desirable to provide intimate contact between all the reactants by agitation. By the term agitation as used herein, it is intended to include any means for accomplishing intimate contact between the reactants such as rapid stirring, atomization, shaking, efficient bubbling of the gas or gases into the water phase, or rapid passage of the reactants through an elongated pressure-resistant vessel of restricted cross sectional area. The use of a tubular vessel of the latter description is one of the preferred methods of carrying on the present invention.

In practice, it is desirable to use equipment fabricated of or lined with material which will not promote side reactions or contaminate the product. Examples of such materials are: silver, aluminum, tin, glass, stainless steel, and the like.

By means of this invention, a large number of polymers of ethylene with other polymerizable organic compounds may be made. Accordingly, the term "polymer" as used herein and in the claims is intended to include the products obtainable by polymerizing ethylene alone or with other polymerizable materials having ethylenic unsaturation such as: other monoolefins, e. g., propylene, butylene; dichloroethylene, 1,2-dichloroethylene, 2 - chloroprene - 1; tetrafluoroethylene; vinyl ethers, ketones, esters, and other vinyl compounds such as methyl and propyl vinyl ethers, methyl and ethyl vinyl ketones, vinyl chloroacetate, vinyl chloride, vinyl acetate, vinyl propionate, N-vinyl phthalimide, vinyl thiol acetate, methyl vinyl thioether, methyl vinyl sulfone, vinyl carbazole, vinyl sulfonic esters; styrene; stilbene; acrylic and methacrylic amides, nitriles, esters and other acrylic and methacrylic compounds, e. g., methylene diacrylate and dimethacrylate, ethyl, propyl, butyl and amyl acrylates and methacrylates; alpha-haloacrylic acids and esters, e. g., methyl alpha-chloroacrylate; esters of propionic and itaconic acids, e. g., methyl crotonate and diethyl itaconate; butadiene, isoprene, choloro-2-butadiene-13; terpenes, e. g., limonene and camphene.

The following examples will illustrate how the invention may be practiced. Parts are by weight unless otherwise stated.

*Example 1*

A silver lined steel reaction vessel is charged with 10 parts of water and 1 part of benzene. The vessel is closed, an internal mechanical stirrer put in motion, and ethylene injected at a pressure such that at the reaction temperature of 200° C. to 220° C., to which the vessel is heated, the pressure is approximately 1000 atmospheres.

As soon as the reaction commences, from the bottom of the reaction vessel, a liquid phase comprising a mixture of polymer, water and benzene, is continuously withdrawn and passed into a separating vessel maintained at a lower pressure and temperature than that of the reaction vessel.

From the top of the separating vessel, unreacted ethylene is conducted, together with additional benzene and water, to the reaction vessel for further reaction. The water in the liquid phase remaining in the separating vessel, together with benzene in admixture therewith may be recirculated to the reaction zone after removal therefrom of its polymer content.

The ethylene employed has an oxygen content of approximately 30 parts per million. The water and benzene ratios, based upon the ethylene introduced, are maintained at 4 parts of water and 0.4 part of benzene per part of ethylene introduced.

*Example 2*

A stainless steel tube of $\frac{1}{8}$ inch internal diameter and of 40 ft. in length is charged with 6 parts of water and 0.35 part of benzene. Under 1000 atmospheres pressure, ethylene containing 80 parts oxygen per million is constantly introduced into the inlet end of the reaction vessel together with 0.35 part of benzene and 6 parts of water per part of ethylene introduced. The tubular reaction vessel is maintained at a temperature within the range of from 160 to 225° C., preferably being submerged in a boiling liquid whose operating temperature is determined by the pressure on the boiling liquid system.

A product draw-off valve at the converter exit lets down directly into an atmospheric pressure separator from which the gas and liquid are continuously drawn and the solid polymerization product cleaned out hourly. The gas feed return to the inlet of the tube is controlled by the setting of a draw-off valve, which valve is electrically heated to prevent freezing and to provide smooth, sure operation.

The solid polymerization product obtained according to this example, as well as by the process of Example 1, is found to have highly improved characteristics, such as elongation (as high as 500%) tensile strength at break (1200-2500 lbs. per square inch) and flex resistance.

*Example 3*

A stainless steel tube of $\frac{7}{16}$ inch internal diameter and 40 feet in length is charged under 1000 atmospheres pressure, with ethylene, containing about 80 parts oxygen per million, together with 2 parts of benzene per part of ethylene introduced. The ethylene and benzene are brought together, before introduction into the reaction vessel, at the top of a 10 ft. vertical tube 1⅛ inches in diameter and heated to a temperature slightly below that necessary for the reaction before introduction of the ethylene and benzene into the reaction vessel. The reaction vessel is maintained at a temperature in the range of 160 to 225° C.

A product draw-off valve at the converter exit leads directly into an atmospheric pressure separator from which the gas and liquid are continuously withdrawn and the solid polymerization product cleaned out hourly. The gas feed return is controlled by the setting of a draw-off valve, which is electrically heated to prevent freezing and to provide smooth, sure operation.

The product obtained according to this example has approximately the same improved characteristics as that of previous examples.

*Example 4*

A silver-lined steel reaction vessel is charged with 6 parts of water and 1 part of benzene. The vessel is closed, heated, and mechanically agitated after displacing the entrained air with ethylene which contains 30 to 150 parts per million of oxygen. The ethylene is injected at a pressure such that at the reaction temperature of 200 to 220° C., to which the vessel is heated, the pressure is approximately 1000 atmospheres.

As polymerization proceeds further ethylene is injected to maintain the pressure at about 1000 atmospheres throughout the polymerization. At the point that no further ethylene is absorbed, the vessel is cooled and the resulting product discharged.

The product obtained in this batch, as distinguished from the continuous operation of the prior examples, has the same generally improved characteristics of the product described in the preceding examples.

Various changes may be made in the details and preferred embodiments of this invention without departing therefrom or sacrificing any of the advantages thereof.

We claim:

1. A continuous process for polymerizing ethylene to high tensile strength solid polymers which comprises continuously passing ethylene into a tubular reaction zone and subjecting it therein to temperatures between 100 and 400° C. and pressures above 500 atmospheres in the absence of a dispersing medium, in the presence of a catalyst selected from the group consisting of oxygen and substances yielding oxygen under the reaction conditions, in the presence of from 1 to 6 parts of water per part by weight of ethylene and on the ethylene weight basis from 0.1 to 2 parts of a material selected from the group consisting of benzene and chlorbenzene and continuously discharging the high tensile strength solid polymer of ethylene from the reaction zone.

2. A continuous process for polymerizing ethylene to high tensile strength solid polymers which comprises continuously passing ethylene into a tubular reaction zone and subjecting it therein to temperatures between 100 and 400° C. and to pressures above 500 atmospheres, in the presence of a catalyst selected from the group consisting of oxygen and substances yielding oxygen under the reaction conditions, in the absence of a dispersing medium and in the presence of from 0.1 to 0.5 part of benzene and from 1 to 6 parts of water per part by weight of ethylene and continuously discharging the high tensile strength solid polymer of ethylene from the reaction zone.

3. A continuous process for producing high tensile strength solid polymers of ethylene which comprises continuously passing ethylene into a tubular pressure-resistant vessel at a pressure of 500 to 1500 atmospheres, a temperature of 150 to 250° C. in the absence of a dispersing medium and in the presence of from 1 to 6 parts of water and 0.1 to 0.5 part, based on the weight of ethylene introduced, of a material selected from the group consisting of benzene and chlorobenzene, the ethylene containing from 30 to 150 parts per million of oxygen and continuously discharging the high tensile strength solid polymers of ethylene from the vessel.

4. A continuous process for producing high tensile strength solid polymers of ethylene which comprises continuously passing ethylene into a tubular reaction zone and subjecting it therein to a pressure of 1000 atmospheres at a temperature of 160 to 225° C., in the presence of 0.2 part by weight of benzene per part of ethylene in the absence of a dispersing medium and in the presence of 6 parts of water per part of ethylene, the ethylene containing from 50 to 80 parts per million of oxygen and continuously discharging the high tensile strength solid polymer of ethylene from the reaction zone.

ALFRED T. LARSON.
NORMAN W. KRASE.